United States Patent [19]
Lee

[11] 3,827,455
[45] Aug. 6, 1974

[54] SELF-SEALING SYSTEM FOR STORING AND DISPENSING A FLUID MATERIAL

[75] Inventor: Walter Joe Lee, Lake Jackson, Tex.

[73] Assignee: The Dow Chemical Company, Midland, Mich.

[22] Filed: Sept. 6, 1973

[21] Appl. No.: 394,950

[52] U.S. Cl.............. 137/375, 137/264, 137/613, 220/9 C, 220/88
[51] Int. Cl................. B65d 87/48, F17c 13/00
[58] Field of Search .......... 137/613, 255, 264, 265, 137/266, 375, 571, 572; 220/9 C, 88; 222/131; 244/135 A, 135 R, 135 C

[56] References Cited
UNITED STATES PATENTS

| | | | |
|---|---|---|---|
| 1,669,022 | 5/1928 | Root, Jr. | 137/375 X |
| 2,434,956 | 1/1948 | Prentiss | 137/375 X |
| 3,360,001 | 12/1967 | Anderson | 137/375 |
| 3,538,939 | 11/1970 | Hoffman | 137/264 |

Primary Examiner—William R. Cline
Assistant Examiner—Ira S. Lazarus
Attorney, Agent, or Firm—V. Dean Clausen; Lloyd S. Jowanovitz

[57] ABSTRACT

The self-sealing system disclosed herein is particularly adapted for storing and dispensing a liquid composition, such as a liquid fuel. The fuel is stored in one or more containers which are connected by a conduit to a use point, such as an engine. The containers and conduit are enclosed by a jacket which is spaced from these components. The jacket space is divided into gas-tight sections, with each section being filled with a gas under pressure. Pressure-actuated valves are installed in the conduit at several positions between the containers and the use point. At least one valve is in direct communication with each gas tight section. In normal operation, the valve is held in open position. If the jacket, the containers, or the conduit are ruptured at any point, an immediate pressure drop will occur in the affected section. The pressure drop will actuate the nearest valve and close the valve to stop the flow of fuel at that point.

5 Claims, 1 Drawing Figure

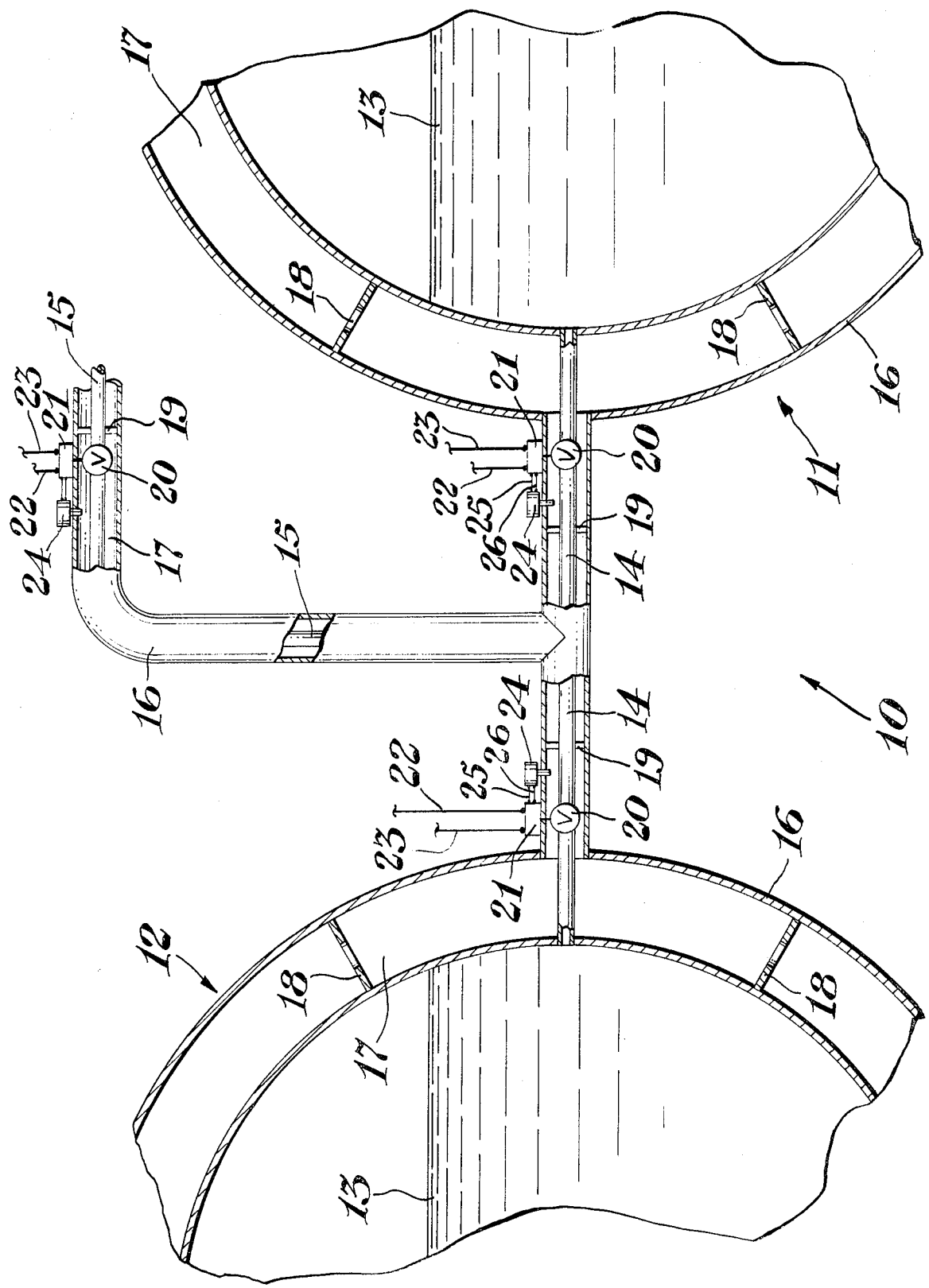

SELF-SEALING SYSTEM FOR STORING AND DISPENSING A FLUID MATERIAL

BACKGROUND OF THE INVENTION

The invention relates to a self-sealing system for storing and dispensing a fluid material, such as a liquid fuel.

It is well recognized that present systems for storing and dispensing volatile or explosive liquids and gases are not entirely satisfactory from a safety standpoint. A typical system in which safety problems exist is in the use of liquid fuels, such as gasoline, in automobiles, boats, aircraft, and the like. For example, if a puncture or a break occurs in a tank or a line of the fuel system, the fuel may leak out and generate a serious fire or explosion hazard.

Other instances in which a fluid leak can be hazardous is in stationary storage systems, such as multi-compartment barges, fuel tankers, refinery storage tanks, and the like. Still other areas in which fluid loss can be undesirable are systems in which valuable fluids or highly toxic fluids are stored and dispensed.

SUMMARY OF THE INVENTION

The fluid handling system of this invention comprises basically a container for holding or storing a fluid material and a conduit for carrying the fluid from the container to a use point. A jacket encloses both the container and the conduit. The jacket is separated from the container in the conduit so that there is a space defined between these components. Solid members are positioned at various points between the jacket and the conduit so that the jacket space is divided into adjacent sections which are gas-tight. In a preferred embodiment, each gas-tight section in the jacket space is filled with a gas, such as air, which is under a positive pressure.

A series of pressure-actuated valves are positioned in the conduit between the container and the use point. At least one valve is installed in each gas-tight section. The valves are installed such that a pressure sensitive device for operating the valve is in communication with the gas-filled space in each jacket section. In normal operating position the valve is held open by the pressure sensitive device. If a puncture or break occurs in the container or conduit, the resulting decrease in positive pressure will close the valve and stop the flow of fluid at the closed valve. In an alternative embodiment, each gas-tight section can be adapted to operate under a reduced pressure condition, i.e., a partial vacuum. In a partial vacuum system each valve would be set to close under a condition of pressure increase, rather than pressure decrease.

DESCRIPTION OF THE DRAWING

The single FIGURE of the drawing is a front elevation view, mostly in section, of one embodiment of the fluid storing and dispensing system of this invention.

DESCRIPTION OF A PREFERRED EMBODIMENT

To illustrate the practice of the invention, the system shown herein is a typical unit which might be used for handling a liquid composition, such as gasoline fuel, or jet fuel, in an aircraft. Referring to the drawing, the liquid fuel handling unit shown herein is indicated generally by numeral 10. For illustrative purposes, the unit shown includes two fuel tanks 11 and 12, which are suitable for holding the liquid fuel 13. One end of a main conduit 14 connects into each fuel tank 11 and 12. Between tanks 11 and 12 a single branch conduit 15 connects at one end into the main conduit 14. The opposite end of conduit 15 connects into a use point (not shown), such as an aircraft engine.

Conduits 14 and 15 and the fuel tanks 11 and 12 are enclosed by a jacket 16. Jacket 16 is separated from the fuel tanks and conduit, so that a space 17 is defined therein. Several perforated ribs 18 are installed at various points between jacket 16 and each of the fuel tanks 11 and 12 to provide support members. Also, several solid strut members 19 are positioned at various points between the jacket 16 and the conduits 14 and 15. The strut members 19 thus divide the jacket space 17 into adjacent sections which are gas-tight.

Each of the sections of the jacket space 17 are filled with a gas which is under a positive pressure. Examples of suitable gases which may be used are air, nitrogen, carbon dioxide, and the like. A series of pressure-actuated solenoid valves 20 are positioned in conduits 14 and 15 at points between the fuel tanks 11 and 12 and the use point (not shown). As indicated in the drawing, at least one valve 20 is positioned within each of the gas-tight sections.

Connected into each valve 20 is a solenoid operator 21, which will open or close the valve. The solenoid operator is connected into a source of electrical power (not shown) by electrical leads 22 and 23. The solenoid operator, in turn, is actuated by a pressure sensitive electrical control 24. A suitable device which may be used for the control 24 is a conventional airflow control switch. Control switch 24 is fastened to the outer wall of jacket 16, such that the air tube of the device communicates with the gas-filled space in each jacket section 17. Switch 24 is connected into the solenoid operator 21 by electrical leads 25 and 26.

A typical operation of the liquid handling system of this invention will now be described. For purposes of this description it will be assumed that tank 11 is a gasoline tank in an aircraft, which is positioned either in the fuselage or the wing of the aircraft. During normal operation of the aircraft, each of the valves 20 is held in open position by its solenoid operator 21. This permits unrestricted flow of gasoline 13 from tank 11 through the conduits 14 and 15 and into the aircraft engine.

Referring again to the drawing, it will be seen that if both the jacket 16 and tank 11 are punctured, at least some of the liquid fuel 13 will leak out of the tank. However, immediately after a puncture occurs in jacket 16, the control switch 24 on the valve 20 adjacent to tank 11 will sense the drop in gas pressure in space 17. The drop in gas pressure will trip the switch 24 to activate the solenoid operator 21. The solenoid operator, in turn, will then close the valve 20 next to tank 11. With the valve next to tank 11 in closed position, only that fuel which can leak through the puncture in tank 11 will be lost. In other words, any cross flow of fuel from tank 12 to tank 11, or any back flow of fuel from line 15 to tank 11, will be stopped at the closed valve.

Another situation which is contemplated is that a puncture may occur only in the jacket 16. For example, assume that only that part of jacket 16 which encloses tank 11 is punctured at some point. In this situation, since there would be no fuel leaking out of the tank 11, it might be desirable to have the flow of fuel continue through the conduit 14 and 15. So that the fuel flow would continue, therefore, it would be desirable to have an override system which would immediately reopen the valve 20 next to tank 11 after it had closed.

Certain details regarding structure, materials of construction, and operating conditions of the present fluid handling system will now be described. It is contemplated that the present system would be suitable for storing and dispensing either gases or liquids. In a preferred embodiment, the system is adapted for handling of liquid compositions, such as a gasoline fuel, or jet fuel. The space 17 defined between jacket 16 and the fuel tanks 11 and 12 and conduits 14 and 15, is preferably filled with an inexpensive gas, such as air. In systems where safety is a factor, it may be necessary to use fluids which are more expensive than air. Examples would include inert gases or fire-extinguishing fluids, such as $CO_2$, $N_2$, or fluorocarbon fluids, such as Freon.

The gas pressure within each gas tight section of the jacket space 17 can vary within wide limits. The actual amount of pressure applied in each section will depend on several factors. Such factors include the type of pressure-actuated valves which are used, and the type of materials which are used in fabricating the fuel tanks, and in fabricating the conduits and the jacket. Tanks 11 and 12 may be constructed of those materials which have sufficient strength and which are compatible with the particular gas or liquid which is being handled. Tanks suitable for storing liquid fuels could be constructed of light weight metals, such as aluminum and magnesium, and alloys of these metals. Preferably, the conduits 14 and 15 should be fabricated of the same materials as the tanks 11 and 12. In some instances, however, copper may be preferred for the conduit material. Jacket 16 should be constructed of materials which have sufficient strength to withstand the gas pressure in each jacket section and which are compatible with the gas being used. For some embodiments, the jacket material could be the same as that of the tanks and conduits. In other embodiments, the jacket could be made of flexible or resilient materials, such as synthetic rubber compositions or plastic resin materials.

For the pressure-actuated valves 20, various commercially available valves are suitable for this purpose depending on the fuel handling facilities involved. Examples of valves which may be used are plunger or piston type valves, diaphragm valves, and floating seat valves. A basic requirement is that the valve be of a type which can be held in the normally open position, either by direct force of the gas pressure in jacket 17, or by indirect action, such as the commercially available solenoid valves. The objective is to hold the valve normally open during normal operation of this system, but to have the valve close in response to a condition of decreased pressure (or increased pressure if the jacketed space is under vacuum) in jacket space 17. If an override control is desired, for example, to reopen a closed valve, the soleniod operated valve is best adapted to this type of system.

What is claimed is:

1. A self-sealing system for storing and dispensing a fluid material, which includes the combination of:

a container which is adapted for holding a fluid material;

a conduit which is adapted for carrying the fluid material from the container to a use point, the conduit being connected at one end to the container, and at the opposite end to the use point;

a jacket means which encloses the container and the conduit, which is spaced from the container and the conduit, and which comprises adjacent gastight sections, the space defined in each jacket section being filled with a gas under a positive pressure;

a series of valves in which each valve includes a pressure-actuated device for opening or closing the valve, each valve being positioned in the conduit at a point between the container and the use point, at least one valve being included for each gas-tight section, the pressure-actuated device of each valve being in communication with the gas-filled space defined in each jacket section, and wherein each valve is held in the normally open position by the pressure-actuated device; whereby a decrease in the positive pressure of the gas confined in a given jacket section will actuate the pressure-actuated device to close the valve and stop the flow of fluid at the closed valve.

2. The system of claim 1 in which the fluid material held in the container is a liquid composition.

3. The system of claim 1 in which the fluid material held in the container is a gas composition.

4. The system of claim 1 in which the fluid material held in the container is a hydrocarbon fuel.

5. The system of claim 1 in which each gas tight section is adapted for a condition of partial vacuum and an increase in pressure within the said section will actuate the pressure-actuated device to close the valve and stop the flow of fluid at the closed valve.

* * * * *